Oct. 13, 1953     P. H. PLANETA     2,655,267
COMBINATION DRAINER BASKET AND RECEPTACLE SUPPORT
Filed July 21, 1952     4 Sheets-Sheet 1
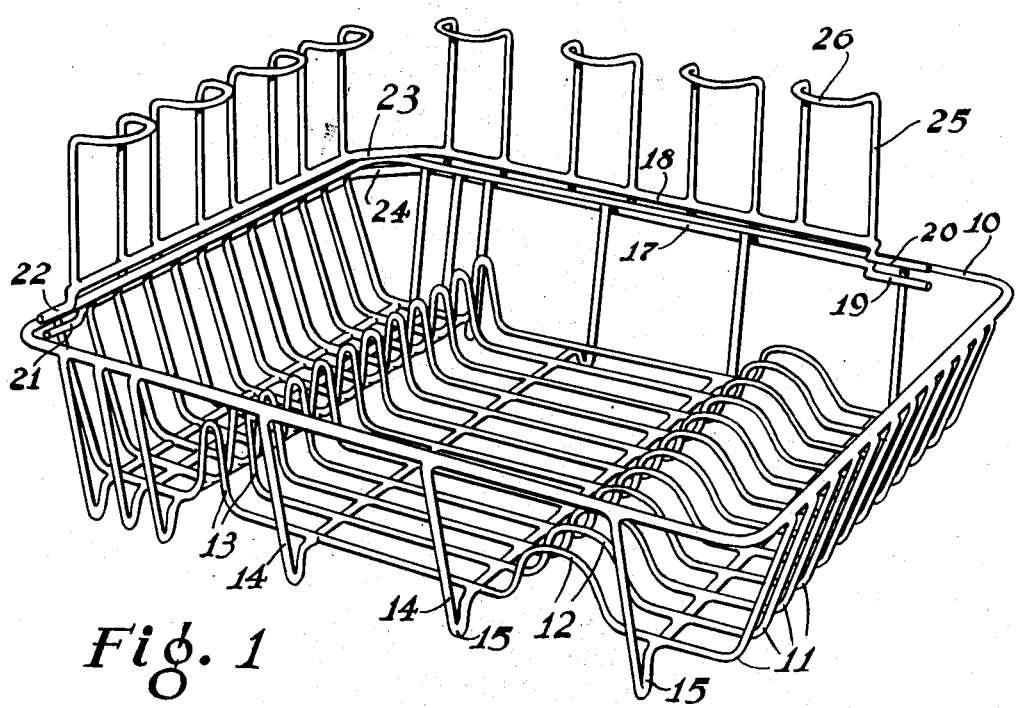
Fig. 1
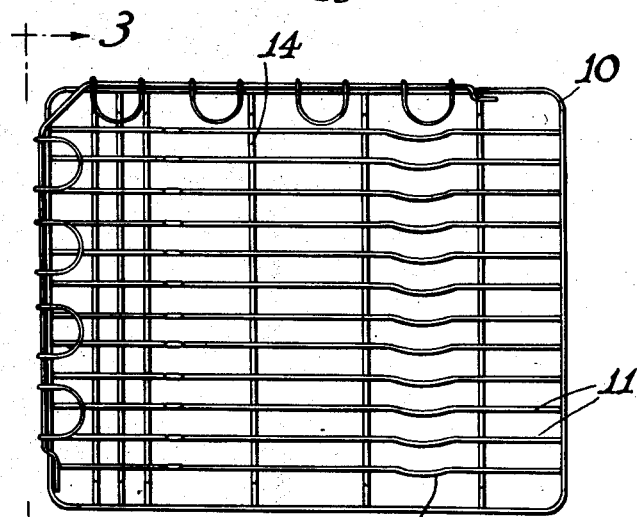
Fig. 2
Fig. 3
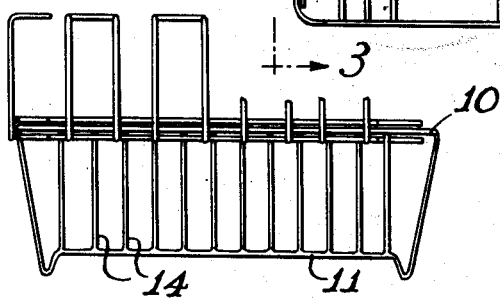
INVENTOR.
Paul H. Planeta
BY
William A. Zalesak
ATTORNEY

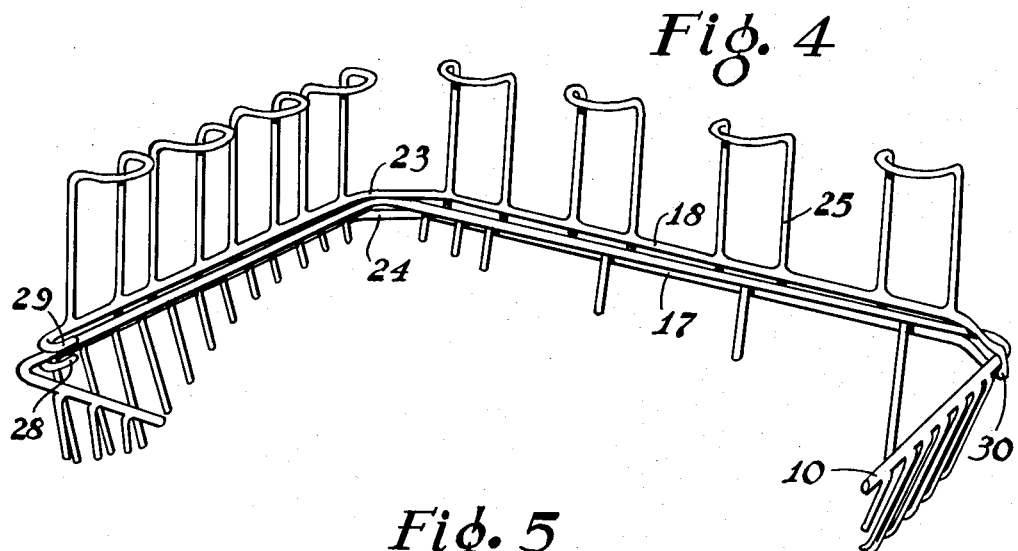
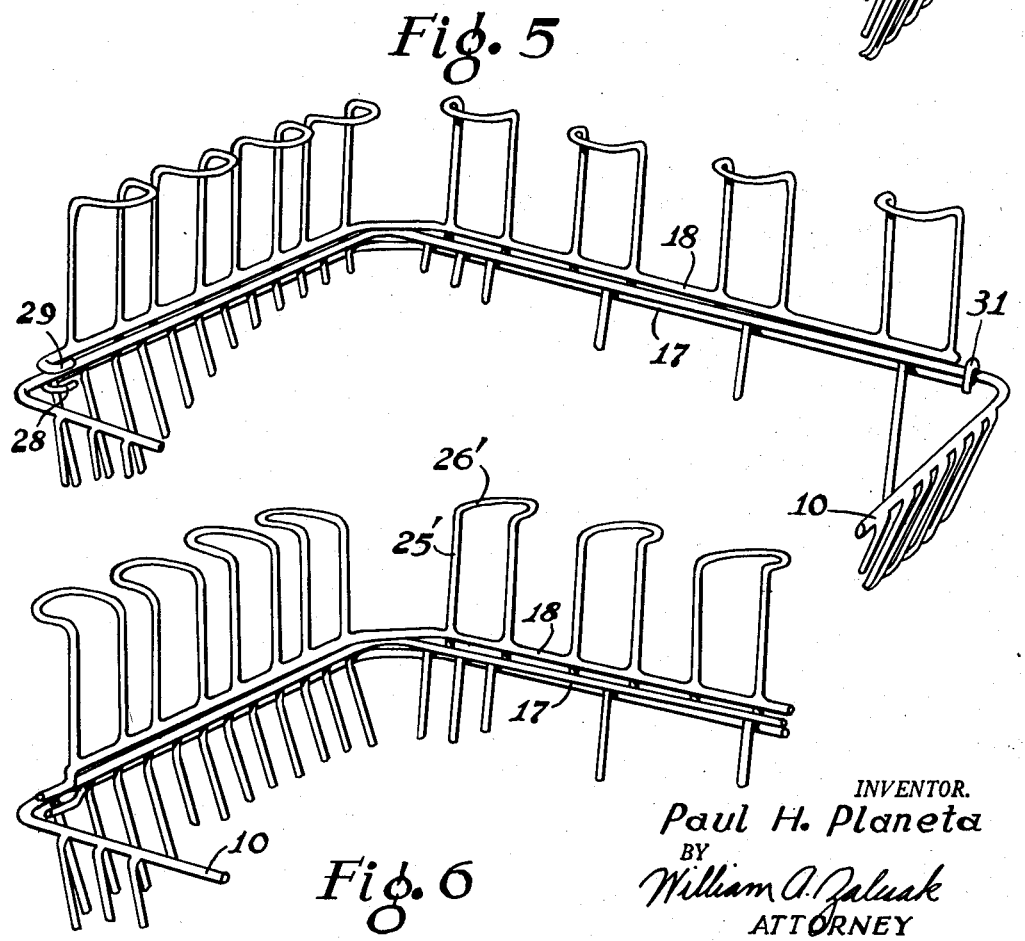

INVENTOR.
Paul H. Planeta
BY
William A. Zaluzek
ATTORNEY

Oct. 13, 1953     P. H. PLANETA     2,655,267
COMBINATION DRAINER BASKET AND RECEPTACLE SUPPORT
Filed July 21, 1952     4 Sheets-Sheet 4

INVENTOR.
Paul H. Planeta
BY
William A. Zalesak
ATTORNEY.

Patented Oct. 13, 1953

2,655,267

UNITED STATES PATENT OFFICE 2,655,267

COMBINATION DRAINER BASKET AND RECEPTACLE SUPPORT

Paul H. Planeta, East Hampton, Conn.

Application July 21, 1952, Serial No. 300,079

16 Claims. (Cl. 211—74)

My invention relates broadly to wire rack supports, more particularly to dish drainers.

The present application is a continuation-in-part of my applications Serial No. 141,889, filed February 2, 1950, now forfeited and Serial No. 207,325, filed January 23, 1951.

In one form of dish drainer of the wire rack type, a rectangular shaped basket is formed of a plurality of longitudinally extending wires and transverse cross wires, the free ends of which extend upwardly and terminate in an upper rim. The longitudinal wires of the rack are usually formed to maintain plates in substantially vertical positions or tilted at an angle for draining. A so-called silver tray is usually formed at one end. Usually no provision is made to provide specifically for glasses or cups, which, if placed in the rack, reduce the capacity of the rack and subject the cups and glasses to damage from hard silver or metal implements and heavy plates. If provisions are made for supporting the cups and glasses, out of the way of the silver and dishes, the rack becomes large and cumbersome, difficult to ship and store. There is at the present time nothing available which can be easily attached to existing devices for supporting cups and glasses out of the way and in a position where they readily drain and dry. Nor has any provision been made in prior devices for supporting very small receptacles firmly for ready draining and out of the way of access to the drainer basket proper. Nor is there any means whereby the device can be made detachable and yet can be firmly locked in place and which can be detached and readily stored both for shipment and storage.

It is, therefore, the principal object of my invention to provide an improved dish drainer of the wire rack type.

More specifically, it is an object of my invention to provide such a drainer rack of conventional size and shape having an increased capacity for dishes, silver and glasses.

A still further object of my invention is to provide such a rack having detachable means for supporting glasses and cups or other types of receptacles, which can be easily stored and in which the detachable supporting device may be removed when not in use.

A further object of my invention is to provide a supporting device for glasses, cups and the like, which can be easily attached and detached and can be easily stored with a drainer or left detached when not in use, but can be locked securely in place when in use.

A further object of my invention is to provide a detachable support for a drainer basket which protects glasses, cups and the like and facilitates draining and drying.

A still further object of my invention is to provide a combination drainer basket and receptacle support which can be taken apart for easy shipment and storage.

A further object of my invention is to provide a support for glasses, cups and the like, which, in addition to being easily attached and detached, is self-locking, can be used in more than one position, and can be easily fabricated.

A still further object of my invention is to provide such a support which can be applied to most existing drainer baskets of the wire rack type.

Another object of my invention is to provide a rack having means for supporting receptacles of various shapes and sizes and for the most part outside of the confines of the drainer basket.

These and other objects will appear hereinafter.

My device may briefly be described as a supporting rack including a pair of spaced rim engaging members which can be locked to the top brim of the conventional drainer basket and which have extending therefrom supports over which glasses, cups and the like can be placed in inverted positions for draining purposes. The device is constructed so that the upper rim member of the basket is engaged between the spaced members of the supporting rack which is provided with end means for locking the rack to the rim of the basket, but permits easy detachment therefrom when the device, which in one form is L-shaped but which also may be U-shaped, is flexed, the spaced members being so formed that the ends overlap and extend within the rim member and have an intermediate portion extending within the periphery of the basket rim member for receiving the rim member. The supports upon which the glasses, cups and the like are supported are generally inverted U-shaped members and in a modification have smaller support members intermediate the legs of the U-shaped members for supporting smaller receptacles which can be gripped between the U-shaped members and the intermediate members.

The novel features which I believe to be characteristic of my invention are set forth with particularity in the appended claims, but the invention itself will best be understood by reference to the following description taken in connection with the accompanying drawing in which:

Fig. 1 is a perspective view of a drainer basket incorporating a supporting rack for glasses, cups and the like and made according to my invention;

Fig. 2 is an end view with parts broken away of the basket shown in Fig. 1;

Fig. 3 is a plan view of Fig. 1;

Fig. 4 is a perspective with parts broken away of a modification of a rack made according to my invention;

Fig. 5 is another perspective partially broken away to show a further modification of my invention;

Fig. 6 is a perspective with parts broken away of a still further modification of my invention;

Figure 7:
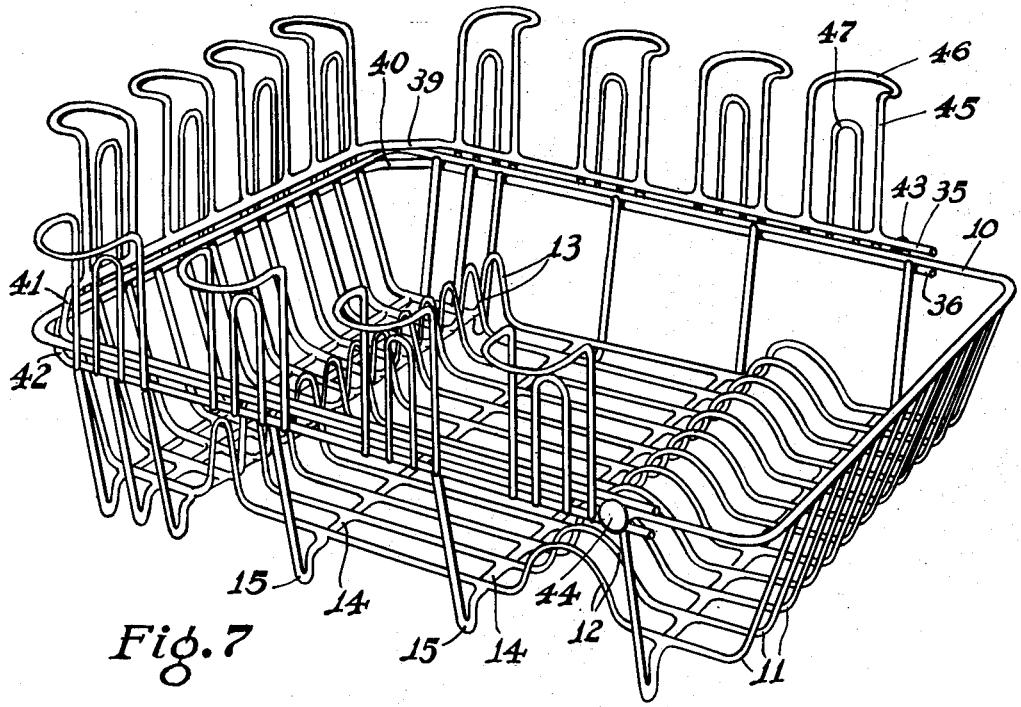
Fig. 7 is a perspective of a modification of my invention.

The usual drainer basket is provided as shown in Fig. 1 with a top brim member 10 and a plurality of longitudinally extending cross elements 11 having upwardly turned ends secured to the rim. Intermediate portions 12 are arcuate-shaped, upturned and tilted at an angle to support plates therebetween, the upturned portions 13 providing between them and the end a silver tray. Transverse members 14 have upwardly turned ends secured to the rim member and extend across and are secured by welding, for example, to longitudinally extending members 11. Feet 15 may be provided on the transverse members. The whole basket may be coated with a plastic material or rubber to protect the dishes and also to serve as a rust preventive coating for the wire rack.

In accordance with my invention, I provide a detachable glass or tumbler support or rack comprising spaced members 17 and 18 formed preferably in the shape of an L, but which may have any shape to conform with the drainer basket with which used. The upper rim 10 of the basket is received between these two members 17 and 18, which may be provided at one end with the inwardly offset portions 19 and 20 and at the other end with inwardly offset portions 21 and 22. The junction of the legs of the L-shaped members at 23 and 24 are formed at a 45 degree angle so that these portions extend within the periphery of the rim member and the corner of the rim member 10 may extend outwardly therebetween and be received between these two members. As shown in Figs. 1, 2, and 3, ends 19 and 20 extend beyond the first upturned portion of the first transverse member 15, and the members 21 and 22 enter the basket between the two longitudinally extending members 11 adjacent the closure side of the basket.

The support has a plurality of inverted U-shaped members 25 secured across the members 17 and 18 and extending upwardly to an inturned portion 26, which, although shown turned inwardly, could be turned outwardly as shown by members 25' and 26'. The glasses are supported in an over-turned position to drain and dry, being out of the way of the silver and dishes.

To detach the support rack, the support is flexed so that the ends of the members 19 and 20 move to the left and pass the first upright. The rack is then pivoted about members 21 and 22 to release the support from the top rim member. Attachment is made by the reverse process.

It will be noted that the length of the portions 21 and 22 is greater than the spacing between the two transverse members 11 to prevent the rack from being accidentally displaced from the rim member.

In Fig. 4 it will be noted that the two members 17 and 18 are provided with modified end elements 28 and 29 in the form of hooks which receive between them the upper rim member, the hook 28 being engaged around the first upright portion of the transverse member 11. The other end is provided with a loop 30 which can be pivoted around to engage the opposite corner of the basket as shown. There is enough flexibility in the members 17 and 18 to permit the loop 30 to be drawn around and engage the upper rim member.

In Fig. 5 is shown a still further modification in which the lower member 17 is provided with a hook 31 lying in a plane transverse to the member 17. In Fig. 6 the upper ends of the U-shaped support members 25' may have their upper ends 26' lie in a plane at an angle to the vertical but extend outwardly to lie outside the perimeter of the basket.

It is obvious that the receptacle supporting rack can be secured to either end of the basket.

Figure 8:
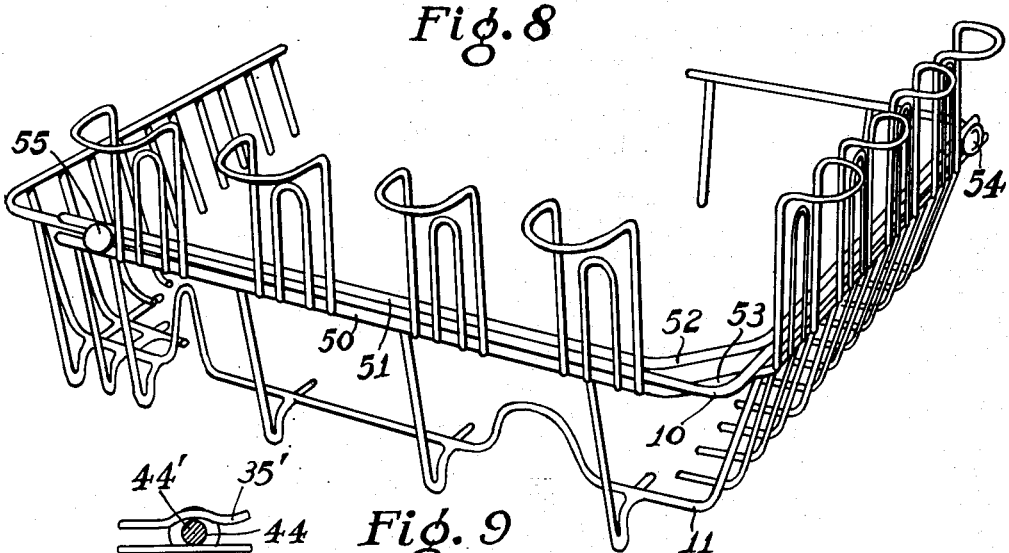
Fig. 8 is a perspective partially broken away of a further modification of my invention.

In accordance with the modification of my invention shown in Fig. 7 I provide a detachable glass or tumbler supporting rack including parallel spaced members 35 and 36 formed either in a U-shape as shown in Fig. 7, or members 37 and 38 formed in an L-shape as shown in Fig. 8, or which may be of any shape to conform with the drainer basket with which the device is used. The device can be used for baskets made of apertured material of sheet form provided the basket includes a rim or lip member to which the rack may be attached. The upper rim member 10 of the drainer basket is received between the two members 35 and 36. The junctures 39, 40, 41 and 42 between the legs of the U-shaped member and the bottom thereof are formed at 45 degree angles so that these positions extend within the periphery of the rim member and the corners of the rim member 10 extend outwardly therebetween and are received between these two members.

The support has a plurality of inverted U-shaped members 45 having ends 46 lying in planes transverse to the longitudinal axis of the U-shaped member to extend outwardly of the drainer basket. The ends of the U-shaped member extend transversely of the members 35 and 36 to secure these members together, preferably by welding, and form a tight bracing action. These members 45 can support cups and larger glasses so that the major portion of the glass lies outside of the drainer basket, making the interior freely accessible for plates and silver to be placed therein. In order to provide for smaller glasses and small receptacles, such as one ounce glasses, and tall thin glasses of a small diameter, I provide inner U-shaped members 47 lying in a plane of the legs of members 45. There is slight flexibility between the legs of members 25 and 27 so that the rim of the small diameter glasses can be gripped between the two elements and firmly held in place while draining.

Figures 9, 10:
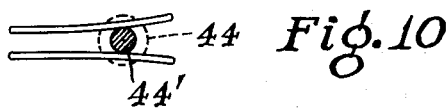
Figs. 9 and 10 show details of construction of the securing means for securing the rack to the rim of the basket.

To simplify the means for securing the rack to the rim member 10, I have provided the light studs 43 and 44 having enlarged heads thereon and which extend outwardly from the rack. The stems of these studs are received between the members 35 and 36. Means may be provided for securing the ends to the members 43 and 44 if desired. Two modifications are shown in Figs. 9 and 10. In Fig. 9 the upper member 35 may be provided with a slight deformation 35' at its end so that the opening is less than that of the stem portion 44' of the stud 44. Thus, as the rack is slid into position, the ends are expanded so that when the rack is in position, the upper member 35 snaps back into position to retain the rack in place. Alternatively, stem 44' of the stud 44 may be made somewhat larger than the spacing between the ends of the rack members 35 and 36 to engage the stud with a friction fit, as shown in Fig. 10.

The arrangement shown in Fig. 8 shows the modification when utilized in L-shape. Here the two parallel members 50 and 51 are again provided with the 45 degree junctures 52 and 53 and the basket is provided with stud members 54 and 55. In this arrangement the L-shaped member may be slightly flexed to release the ends thereof from the stud members 54 and 55. The structure otherwise is like that shown in Fig. 7.

Figure 11:
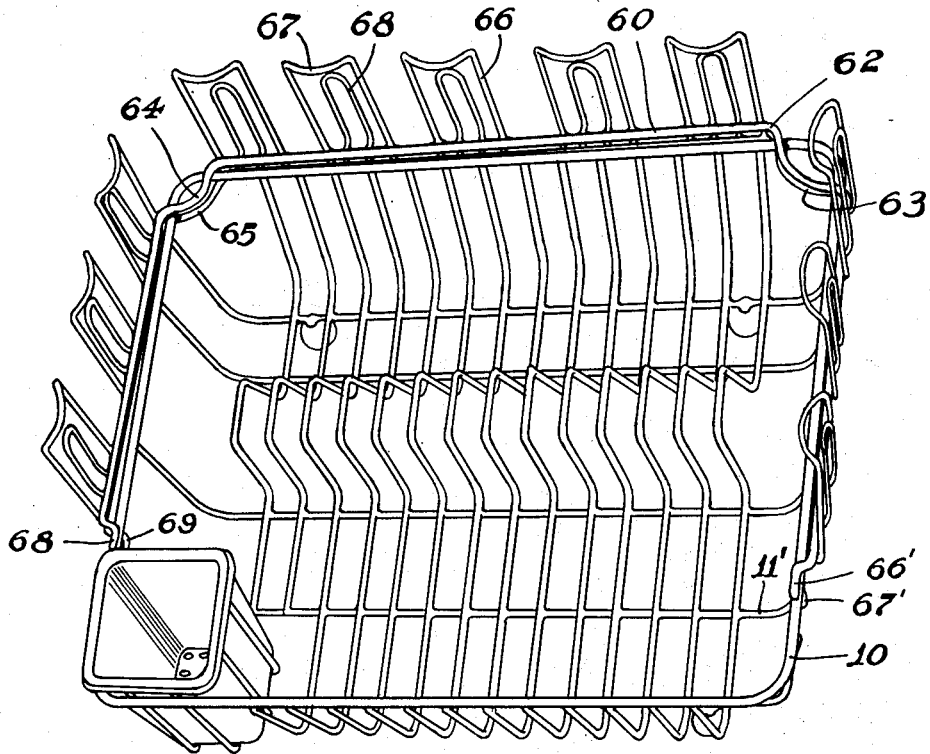
Fig. 11 is a perspective view of another modification of my invention.
Figure 12:
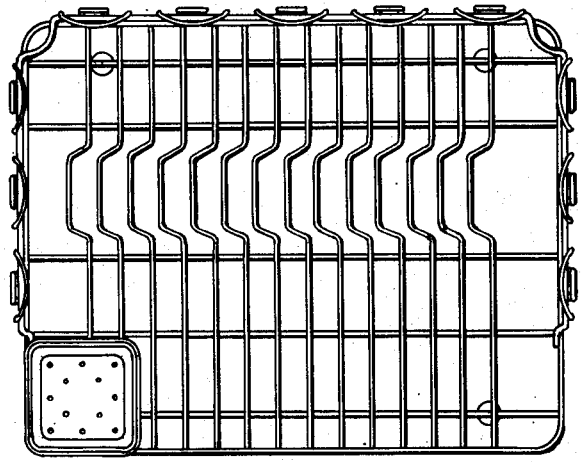
Fig. 12 is a plan view of Fig. 11.
Figure 13:
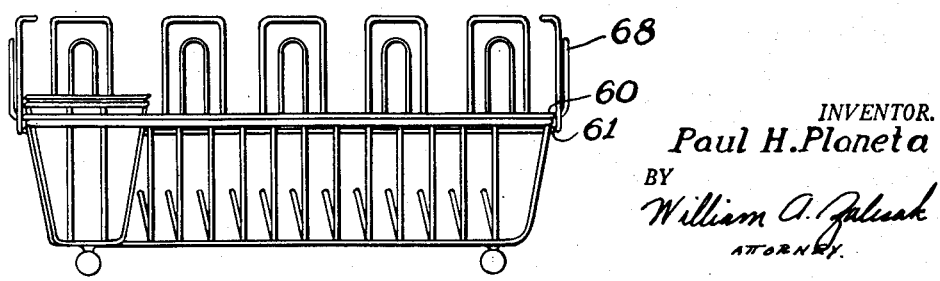
Fig. 13 is a side elevation of Fig. 11.

In the modification shown in Figs. 11 to 13, inclusive, the outer U-shaped supporting members 66 are provided with a closed flat top 67 curved inwardly and lying in a plane perpendicular to the plane passing through the legs of the U-shaped member. These U-shaped members are secured at the ends of their legs to the rod-like elements 60 and 61 which engage the rim of the basket and which are provided with the inwardly curved, overlapping portions 62, 63 and 64, 65, the ends of these elongated members 60, 61 being provided with the portions 66', 67' and 68, 69 which extend inwardly of the rim of the basket and engage a vertically extending portion of the transverse basket members 11'. To provide for support of smaller receptacles, the inner U-shaped member 68 is offset outwardly so that its legs lie in the plane parallel to the plane passing through the legs of the outer U-shaped member. This facilitates insertion of the wall of the receptacle between the members 66 and 68.

A device made according to my invention has all of the advantages pointed out above. It increases the capacity of the basket by providing supporting units outside of the basket proper. The device can be easily attached, and detached when not in use and when it is desired to ship the device in nested arrangement. It is securely locked in position when in place on the basket and by supporting the glasses above the basket in inverted position, draining and drying are facilitated. It may be used with most conventional baskets which are more or less standardized in size and can be used in one of two positions on the rectangularly-shaped rack.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A detachable supporting rack to be attached to a rack member of wire construction having a rim member, said supporting rack including a pair of closely vertically spaced parallel rod-like elements for receiving said rim member therebetween, a plurality of transversely upwardly extending supporting elements attached to said rod-like elements, said rod-like elements having a shape substantially like that of said rim member and having end portions at one end to be extended inwardly of said rim member to engage said rim member, and having means at the other end to be extended inside said rim member for securing said supporting rack to said rim member, said detachable supporting rack having an intermediate portion for overlapping and lying within the boundaries of said rim member to receive said rim member therebetween.

2. A detachable supporting rack to be attached to a rack member of wire construction having a rim member, said supporting rack including a pair of closely vertically spaced parallel rod-like elements for receiving said rim member therebetween, a plurality of transversely upwardly extending supporting elements attached to said rod-like elements, said rod-like elements having a shape substantially like that of said rim member and having end portions at one end to be extended inwardly of said rim member to engage said rim member, and having means at the other end to be extended inside said rim member for securing said supporting rack to said rim member.

3. A detachable supporting rack to be attached to a rack member of wire construction having a rim member, said supporting rack including a pair of closely vertically spaced parallel rod-like elements for receiving said rim therebetween, a plurality of transversely upwardly extending supporting elements attached to said rod-like elements, said rod-like elements having a shape substantially like that of said rim member and having end portions at one end to be extended inwardly of said rim member for engaging said rim member, and having means at the other end to be extended inside said rim member for securing said supporting rack to said rim member, said rod-like members being of L-shape and having the juncture portions of the legs formed at a 45 degree angle to said legs for receiving said rim member within and through said juncture portions.

4. A detachable supporting rack to be attached to a rack member of wire construction having a rim member and longitudinal and transverse members having upwardly extending portions attached to said rim member, said supporting rack including a pair of closely vertically spaced parallel rod-like elements for receiving said rim member therebetween, a plurality of transversely upwardly extending supporting elements attached to said rod-like elements, said rod-like elements having a shape substantially like that of said rim member and having offset end portions at each end to be extended inwardly of said rim member to engage said rim member for securing said supporting rack to said rim member, said offset portions extending between said upwardly extending portions of said rack member when in position on said rack member.

5. A detachable supporting rack to be attached to a rack member of wire construction having a rim member and a plurality of rod-like elements having upwardly extending portions attached to said rim member, said supporting rack including a pair of closely vertically spaced parallel rod-like elements for receiving said rim member therebetween, a plurality of transversely upwardly extending supporting elements attached to said rod-like elements, said rod-like elements having a shape substantially like that of said rim member and having offset end portions at one end to be extended inwardly of said rim for engaging said rim member, and having means at the other end to be extended inside said rim member securing said supporting rack to said rim member, the portions of said rod-like members extending inwardly of said rim member being longer than the space between the upwardly extending portions of the rod-like elements of the rack member.

6. A detachable supporting rack to be attached to a rack member of wire construction having a rim member, said supporting rack including a pair of closely vertically spaced parallel rod-like elements for receiving said rim member therebetween, a plurality of transversely upwardly extending supporting elements attached to said rod-like elements, said plurality of transversely extending supporting elements comprising inverted U-shaped members having the legs secured to said rod-like elements and the closed ends bent to lie in a plane at an angle to the plane passing through the legs of said U-shaped members, said rod-like elements having a shape substantially like that of said rim member and having end portions at each end to be extended inwardly of said rim member to engage said rim member.

7. A detachable supporting rack to be attached to a rack member of wire construction having a rim member, said supporting rack including a pair of closely vertically spaced parallel rod-like elements for receiving said rim therebetween, a plurality of transversely upwardly extending supporting elements attached to said rod-like elements, said rod-like elements having a shape substantially like that of said rim member and having end portions at one end to be extended inwardly of said rim member to engage said rim member, and having means at the other end for securing said supporting rack to said rim member, the end portions of said rod-like members at said one end being offset inwardly of said rim, said means at the other end comprising a loop joining said rod-like members and formed to receive said rim member within said loop.

8. A detachable supporting rack to be attached to a rack member of wire construction having a rim member, said supporting rack including a pair of closely vertically spaced parallel rod-like elements for receiving said rim member therebetween, a plurality of transversely upwardly extending supporting elements attached to said rod-like elements, said rod-like elements having a shape substantially that of said rim member and having end portions of hook shape at one end to be extended inwardly of said rim member for engaging said rim member, and having a loop at the other end to be extended inside said rim member for securing said supporting rack to said rim member.

9. A detachable supporting rack to be attached to a rack member of wire construction and having a rim member, said supporting rack including a pair of closely vertically spaced parallel rod-like elements for receiving said rim member therebetween, a plurality of transversely upwardly extending supporting elements attached to said rod-like elements, said rod-like elements having a shape substantially that of said rim member and having end portions of hook shape at one end to be extended inwardly of said rim member for engaging said rim member, and having at the other end a vertical hook to be extended over and inside said rim member for securing said supporting rack to said rim member.

10. A detachable supporting rack to be attached to a rack member of wire construction having a rim member, said supporting rack including a pair of closely spaced rod-like elements receiving said rim member therebetween, a plurality of transverse supporting elements attached to rod-like elements, said plurality of transversely extending supporting elements comprising inverted U-shaped members having the legs secured to said rod-like elements transversely thereof, the closed ends of said U-shaped members being bent to lie in a plane at an angle to the plane passing through the legs of said U-shaped members and on the outside of the basket perimeter, said rod-like elements having a shape fitting said rim member and other U-shaped members of smaller size positioned between the legs of the first-mentioned U-shaped members, the closed ends of said last U-shaped members terminating at a point below that of the plane in which the closed ends of said first U-shaped members lie.

11. A detachable supporting rack to be attached to a rack member of wire construction having a rim member, said supporting rack including a pair of closely spaced rod-like elements receiving said rim member therebetween, a plurality of transverse supporting elements attached to said rod-like elements, said plurality of transversely extending supporting elements comprising inverted U-shaped members having legs secured to said rod-like members transversely thereof, the closed ends of said U-shaped members being bent to lie in a plane at an angle to the plane passing through the legs of said U-shaped member, said rod-like members having a shape fitting said rim member and other members of smaller size positioned between the legs of said U-shaped members, the ends of said last members terminating below the plane in which the closed ends of said first U-shaped members lie.

12. A detachable supporting rack to be attached to a rack member of wire construction having a rim member, said supporting rack including a pair of closely spaced rod-like elements for receiving said rim member therebetween, a plurality of transverse supporting elements attached to said rod-like elements, said plurality of transversely extending supporting elements comprising inverted U-shaped members having the legs secured to said rod-like members transversely thereof, the closed ends of said U-shaped members being bent to lie in a plane at an angle to the plane passing through the legs of said U-shaped members, said rod-like members having a shape fitting said rim member and other U-shaped members of smaller size positioned between the legs of the first mentioned U-shaped members, the closed end of said last U-shaped members terminating at a point below that of the plane in which the closed end of said first U-shaped members lie.

13. A detachable supporting rack to be attached to a rack member of wire construction having a rim member, said supporting rack including a pair of closely vertically spaced parallel rod-like elements for receiving said rim member therebetween, a plurality of transversely upwardly extending supporting elements attached to said rod-like elements, said plurality of transversely extending supporting elements comprising inverted U-shaped members having the legs secured to said rod-like elements and the closed ends lying in a plane at an angle to the plane passing through the legs of said U-shaped members, said rod-like elements having a shape substantially like that of said rim member and having end portions at each end for securing said supporting rack to said rim member.

14. A detachable supporting rack to be attached to a rack member of wire construction having a rim member, said supporting rack including a pair of closely vertically spaced parallel rod-like elements for receiving said rim member therebetween, a plurality of transversely upwardly extending supporting elements attached to said rod-like elements, said plurality of transversely extending supporting elements comprising inverted U-shaped members having the legs secured to said rod-like elements, said rod-like elements having a shape substantially like that of said rim member and having end portions at each end formed to secure said supporting rack to said rim member.

15. A detachable supporting rack to be attached to a rack member having a rim, said supporting rack including a pair of closely spaced rod-like elements for receiving said rim therebetween, a plurality of transverse supporting elements attached to rod-like elements, said plurality of transversely extending supporting elements comprising inverted U-shaped members having the legs secured to said rod-like elements transversely thereof, the closed ends of said U-shaped members being bent to lie in a plane at an angle to the plane passing through the legs of said U-shaped members, said rod-like elements having a shape fitting said rim, and other U-shaped members of smaller size positioned between the legs of the first-mentioned U-shaped members, the closed ends of said last U-shaped members terminating at a point below the closed ends of said first U-shaped members, said last U-shaped members being offset outwardly.

16. A detachable supporting rack to be attached to a rack member having a rim, said supporting rack including a pair of closely spaced rod-like elements for receiving said rim therebetween, a plurality of transverse supporting elements attached to rod-like elements, said plurality of transversely extending supporting elements comprising inverted U-shaped members having the legs secured to said rod-like elements transversely thereof, the closed ends of said U-shaped members being bent to lie in a plane at an angle to the plane passing through the legs of said U-shaped members, said rod-like elements having a shape fitting said rim, and other U-shaped members of smaller size positioned between the legs of the first-mentioned U-shaped members, the closed ends of said last U-shaped members terminating at a point below that of the plane in which the closed ends of said first U-shaped members lie, said rod-like elements having means at their ends for securing said supporting rack to said rack member.

PAUL H. PLANETA.

No references cited.